United States Patent
Liu et al.

(10) Patent No.: US 9,233,860 B2
(45) Date of Patent: Jan. 12, 2016

(54) SUPERCAPACITOR AND METHOD FOR MAKING THE SAME

(75) Inventors: Jianyun Liu, Shanghai (CN); Su Lu, Shanghai (CN); Hai Yang, Shanghai (CN); Wei Cai, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 321 days.

(21) Appl. No.: 12/991,289

(22) PCT Filed: May 15, 2009

(86) PCT No.: PCT/US2009/044139
§ 371 (c)(1),
(2), (4) Date: Nov. 5, 2010

(87) PCT Pub. No.: WO2010/008670
PCT Pub. Date: Jan. 21, 2010

(65) Prior Publication Data
US 2011/0090620 A1    Apr. 21, 2011

(30) Foreign Application Priority Data

Jun. 24, 2008  (CN) .......................... 2008 1 0126310
Jul. 4, 2008   (CN) .......................... 2008 1 0132992

(51) Int. Cl.
*H01G 9/155* (2006.01)
*C02F 1/469* (2006.01)
*B01D 61/44* (2006.01)
*H01G 9/00* (2006.01)

(52) U.S. Cl.
CPC .............. *C02F 1/4691* (2013.01); *B01D 61/44* (2013.01); *C02F 1/4693* (2013.01); *C02F 2201/46115* (2013.01); *H01G 9/155* (2013.01)

(58) Field of Classification Search
USPC ........... 361/502, 503; 204/416, 235; 210/638; 29/25.03
See application file for complete search history.

(56) References Cited

U.S. PATENT DOCUMENTS

| | | | |
|---|---|---|---|
| 4,975,172 | A | 12/1990 | Yeager et al. |
| 5,115,378 | A | 5/1992 | Tsuchiya et al. |
| 5,194,515 | A | 3/1993 | Takahashi et al. |

(Continued)

FOREIGN PATENT DOCUMENTS

| | | |
|---|---|---|
| JP | 03-041108 A | 2/1991 |
| JP | 06325983 A | 11/1994 |

(Continued)

OTHER PUBLICATIONS

Written Opinion and International Search Report, Oct. 21, 2009 with IDS.

(Continued)

*Primary Examiner* — Eric Thomas
(74) *Attorney, Agent, or Firm* — Global Research

(57) ABSTRACT

A supercapacitor has a first electrode, a second electrode, a first ionic carrier configured to contact the first electrode to provide a first ion-conductive pathway for transportation of ions to and from the first electrode, and a first retaining layer configured to retain the first ionic carrier between the first electrode and the first retaining layer. The supercapacitor also has an electrolyte dispersed between the first and the second electrodes to provide the ions, a first current collector configured to contact the first electrode and a second current collector configured to contact the second electrode. A method for making the supercapacitor is also presented.

33 Claims, 5 Drawing Sheets

(56) References Cited

U.S. PATENT DOCUMENTS

| | | | |
|---|---|---|---|
| 5,425,858 A | 6/1995 | Farmer | |
| 5,538,611 A * | 7/1996 | Otowa | 204/550 |
| 5,658,355 A | 8/1997 | Cottevieille et al. | |
| 5,811,205 A | 9/1998 | Andrieu et al. | |
| 5,986,878 A | 11/1999 | Li et al. | |
| 5,993,996 A | 11/1999 | Firsich | |
| 6,168,694 B1 | 1/2001 | Huang et al. | |
| 6,187,061 B1 | 2/2001 | Amatucci et al. | |
| 6,198,623 B1 | 3/2001 | Amatucci | |
| 6,413,409 B1 * | 7/2002 | Otowa et al. | 205/748 |
| 6,709,560 B2 | 3/2004 | Andelman et al. | |
| 7,192,560 B2 | 3/2007 | Parthasarathy et al. | |
| 7,276,091 B2 | 10/2007 | Park et al. | |
| 7,833,400 B2 * | 11/2010 | Andelman et al. | 204/630 |
| 7,936,555 B2 | 5/2011 | Lin et al. | |
| 8,002,963 B2 * | 8/2011 | Andelman et al. | 205/687 |
| 2005/0103634 A1 | 5/2005 | Andelman et al. | |
| 2006/0046136 A1 * | 3/2006 | Park et al. | 429/128 |
| 2008/0073288 A1 | 3/2008 | Fan et al. | |
| 2008/0144256 A1 | 6/2008 | Cai et al. | |

FOREIGN PATENT DOCUMENTS

| | | |
|---|---|---|
| JP | 08-245801 A | 9/1996 |
| JP | 09309173 A | 12/1997 |
| JP | 11505463 A | 5/1999 |
| JP | 2001-029800 A | 2/2001 |
| JP | 2001029800 A | 2/2001 |
| JP | 2002-210468 A | 7/2002 |
| JP | 2002210334 A | 7/2002 |
| JP | 2002210468 A | 7/2002 |
| JP | 2005-514014 A | 5/2005 |
| JP | 2006073980 A | 3/2006 |

OTHER PUBLICATIONS

Kurita Water Ind Ltd, English language abstract of JP2002-210468, published Jul. 30, 2002.
Sumitomo Electric Industries, English language abstract of JP2001-029800, published Feb. 6, 2001.
Unofficial English translation of Office Action from JP dated Jun. 4, 2013.
Nippon Kasei Chem Co Ltd, English language abstract of JP08-245801, published Sep. 24, 1996.
Office Action issued in connection with corresponding KR Application No. 2010-7029041 on Mar. 10, 2015.
Australian Patent Examination Report issued in connection with corresponding AU Application No. 2009271516 on Dec. 5, 2013.
Taiwan Patent office action issued in connection with corresponding TW Application No. 098101268 on Aug. 20, 2013.
European Patent Examination Report issued in connection with corresponding EP Application No. 09789686.4 on Sep. 4, 2012.

* cited by examiner

SUPERCAPACITOR AND METHOD FOR MAKING THE SAME

BACKGROUND

This invention relates generally to a supercapacitor and a method for making the same. More particularly, this invention relates to a supercapacitor desalination cell and a method for making the same.

Supercapacitors are commonly used as energy storage cells. Generally, the supercapacitors are of a double layer type, in which a pair of electrodes typically comprising particulate activated carbon are separated by a microporous, electron-insulating, ion-conducting separator element, comprising a uniformly-dispersed electrolyte component. The structure of the typical supercapacitor further comprises electrically conductive current collector elements in intimate contact with the respective electrodes.

Applying an electrical potential across the electrodes causes charges to build up in the double layer, which exists at the electrode/electrolyte interface. In the supercapacitor, internal resistance often exists between the electrodes and the separator element as well as inside the electrodes. Accordingly, when charging or discharging the supercapacitor, especially the supercapacitor desalination cell, a large amount of energy may be consumed in order to overcome the internal resistance to urge anions and cations in the electrolyte to move to the respective electrodes or disassociate from the electrodes into the electrolyte.

Attempts have been made to reduce the internal resistance in the supercapacitor through some manner of unifying the particulate carbon electrode composition and conductive collectors. A process of high temperature sintering of the elements to achieve this end is described in U.S. Pat. No. 5,115,378, yet, as is apparent there, the extensive processing steps and high-energy consumption lead to economic undesirability of this approach. Further limiting the general acceptance of the process is the intractability of the resulting solid and unyielding preformed capacitor body, which cannot be readily shaped to conform to special requirements of varying utilizing devices.

Therefore, there is a need for a new and improved supercapacitor structure and a method for making the same to reduce the internal resistance therein.

BRIEF DESCRIPTION

A supercapacitor in accordance with one embodiment of the invention is provided. The supercapacitor comprises a first electrode, a second electrode, a first ionic carrier configured to contact the first electrode to provide a first ion-conductive pathway for transportation of ions to and from the first electrode, and a first retaining layer configured to retain the first ionic carrier between the first electrode and the first retaining layer. Further, the supercapacitor comprises an electrolyte dispersed between the first and the second electrodes to provide the ions, a first current collector configured to contact the first electrode, and a second current collector configured to contact the second electrode.

A supercapacitor desalination cell in accordance with another embodiment of the invention is provided. The supercapacitor desalination cell comprises a first electrode and a second electrode both configured to adsorb ions in a charging state of the cell and desorb ions in a discharging state of the cell. The supercapacitor desalination cell further comprises a first ionic carrier configured to contact the first electrode to provide a first ion-conductive pathway for transportation of the ions to and from the first electrode, and a first retaining layer configured to retain the first ionic carrier between the first electrode and the first retaining layer. Further, the supercapacitor desalination cell comprises a first current collector configured to contact the first electrode and a second current collector configured to contact the second electrode.

A supercapacitor desalination device in accordance with yet another embodiment of the invention is provided. The supercapacitor desalination device comprises a supercapacitor desalination cell comprising a first electrode and a second electrode both configured to adsorb ions in a charging state of the cell and desorb ions in a discharging state of the cell. The supercapacitor desalination cell further comprises a first ionic carrier configured to contact the first electrode to provide a first ion-conductive pathway for transportation of the ions to and from the first electrode, a first retaining layer configured to retain the first ionic carrier between the first electrode and the first retaining layer, a first current collector configured to contact the first electrode and a second current collector configured to contact the second electrode. Further, the supercapacitor desalination device comprises a power source configured to energize the first and the second electrodes to opposite electrical polarities and a liquid source configured to pass a liquid through the cell for desalination.

Further, a method in accordance with yet another embodiment is provided. The method comprises providing a first electrode and a second electrode; providing a first ionic carrier configured to contact the first electrode to provide a first ion-conductive pathway for transportation of ions to and from the first electrode, and a first retaining layer configured to retain the first ionic carrier between the first electrode and the first retaining layer. The method further comprises providing a first current collector configured to contact the first electrode and a second current collector configured to contact the second electrode.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF THE DISCLOSURE

Preferred embodiments of the present disclosure will be described hereinbelow with reference to the accompanying drawings. In the following description, well-known functions or constructions are not described in detail to avoid obscuring the disclosure in unnecessary detail.

Figure 1:
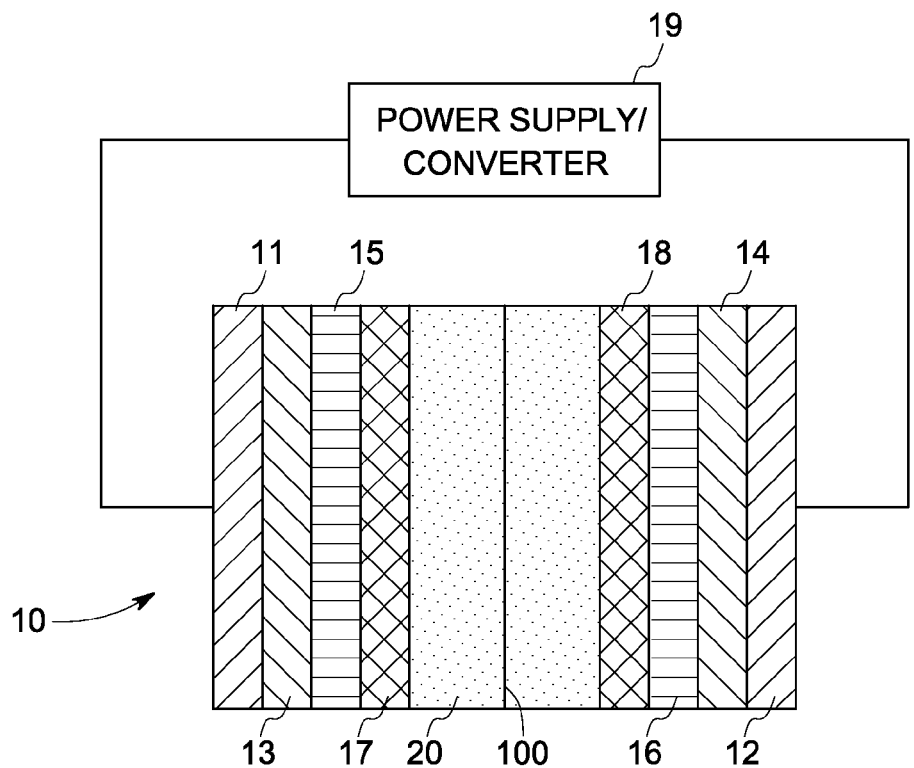
FIG. 1 is a schematic cross-section diagram of a supercapacitor in accordance with one embodiment of the invention.

As illustrated in FIG. 1, a supercapacitor 10 comprises a first current collector 11, a second current collector 12, a first electrode 13, a second electrode 14, a first ionic carrier 15, a second ionic carrier 16, a first retaining layer 17 and a second retaining layer 18. The first current collector 11 may be connected to a positive terminal of a power source 19, and the second current collector 12 may be connected to a negative terminal of the power source 19. In one embodiment, an electrolyte solution 20, such as sodium chloride etc, may be dispersed between the first and the second electrodes 13 and 14 of the supercapacitor 10.

In the illustrated embodiment, the first and second current collectors 11 and 12 are in intimate contact with the first and second electrodes 13 and 14 respectively so that the first electrode 13 may act as a positive electrode (anode) and the second electrode 14 may act as a negative electrode (cathode). The first ionic carrier 15 is positioned between the first electrode 13 and the first retaining layer 17 for carrying anions. The second ionic carrier 16 is positioned between the second electrode 14 and the second retaining layer 18 for carrying cations. Both the first and second retaining layers 17 and 18 are for ion exchange and may be passable for both anions and cations in the electrolyte 20, that is, for allowing ions to travel to the electrodes from the solution 20 contacting the retaining layers 17 and 18. In particular, the first retaining layer 17 may be only passable for anions and the second insulating space 18 may be only passable for cations. Meanwhile, the first and second retaining layers 17 and 18 can protect the ionic carriers 15 and 16, such as macromolecule polyelectrolyte from leaking out through the retaining layers so as to lose effectiveness. In certain embodiments, the first and second ionic carriers 15 and 16 may be for carrying both the anions and the cations.

In particular, the supercapacitor 10 further comprises a spacer 100, which may be any ion-permeable, electronically nonconductive material, including membranes and porous and nonporous materials to separate the first retaining layer 17 and the second retaining layer 18. The spacer 100 may have or itself may be a space for accommodating the electrolyte 20 or a flow channel through which a liquid passes between the first and second retaining layers 17 and 18, especially when a distance therebetween is small.

In a charging state of the supercapacitor 10, positive and negative electric charges from the power source 19 are accumulated on surfaces of the first and second electrodes 13 and 14, respectively. Meanwhile, the positive and negative electric charges attract anions and cations in the ionized electrolyte 20 to cause them to be adsorbed on the surfaces of the first and second electrodes 13 and 14. In a discharging state of the supercapacitor 10, the adsorbed anions and cations dissociate from the surfaces of the first and second electrodes 13 and 14 to return in the electrolyte 20. Meantime, the released energy may be used to drive an electrical device, such as a light bulb, or recovered through an energy recovery cell, such as a bi-directional DC-DC converter.

In the illustrated example, opposite surfaces of the anion carrier 15 contact the anode 13 and the first retaining layer 17, respectively. And opposite surfaces of the cation carrier 16 contact the cathode 14 and the second retaining layer 18, respectively. In particular, the ionic carriers 15 and 16 may disperse into the anode 13 and the cathode 14 respectively, that is, the ionic carriers 15 and 16 may interpenetrate and extend from interstitial spaces of the respective electrodes to the retaining layers 17 and 18. In embodiments of the invention, the ionic carriers 15 and 16 are to produce first and second ion-conductive transporting pathways to and from the electrodes 13 and 14 to reduce internal resistance between the respective electrodes and the retaining layers during charging and discharging cycles. Accordingly, in the charging state, a relatively small amount of energy may be consumed to adsorb the anions and cations in the electrolyte 20 to the surfaces of the first and second electrodes 13 and 14. And in the discharging state, the adsorbed anions and cations may dissociate from the surfaces of the electrodes 13 and 14 to return into the electrolyte 20 with consuming only a relatively small amount of energy.

In certain embodiments, the first ionic carrier 15 may be an ionic polymer including a cation group, such as a quaternary amine group, for transmission of the anions. The second ionic carrier 16 may be an ionic polymer including an anion group, such as a sulfonic acid group ($SO_3H$) or a carboxylic acid group ($COOH^-$) group, for transmission of the cations. In the illustrated embodiment, the first and second ionic polymers 15 and 16 include first and second polyelectrolyte solutions, respectively. The first polyelectrolyte solution may include poly(diallyldimethyl ammonium chloride) (PDDA) solution, and the second polyelectrolyte solution may include polystyrene sulfate sodium (PSS) solution. PSS may also be referred to as the sodium form of sulfonated polystyrene. Additionally, the ionic carriers 15 and 16 may be an ionic polymer, such as a macromolecular ampholyte, such as polyphosphate for facilitating transmission of both the anions and cations in the electrolyte 20 to the electrodes 13 and 14.

When assembling the elements of the supercapacitor 10, disposing the polyelectrolyte solutions on the respective electrodes 13 and 14, or immersing the electrodes 13 and 14 into the polyelectrolyte solutions for a period of time, such as 2 hours or 2 days, and then pressing the retaining layers 17 and 18 on the treated electrodes 13 and 14 respectively can form the structure of the supercapacitor 10.

During charging or discharging, the retaining layer 17 or 18 can block the macromolecular ions in the PSS or PDDA solution from leaking out so that the PSS or PDDA is confined between the electrode 13 or 14 and the retaining layer 17 or 18 to facilitate transmission of the anions or cations of the electrolyte 20 and to reduce energy consumption.

In one embodiment, the ionic polymer 15 or 16 is in a form other than solution form, such as a gel or semi-hardened form. The polyelectrolyte gel 15 or 16 can be formed on the surface and inside of the electrode 13 or 14 by in-situ polymerization of the polyelectrolyte monomer, or by adding a cross linker reagent, such as N,N'-Methylenebisacrylamide or divinyl benzene to crosslink the polyelectrolyte molecular, which can be accomplished by one skilled in the art. In some embodiments, when the ionic polymers 15 and 16 are in gel form, the retaining layers 17 and 18 may not be required. For particular embodiments, the retaining layers 17 and 18 are employed to prevent the fragile polyelectrolyte gel layer from spalling and losing effectiveness thereby. Additionally, the spacer 100 may also be employed.

In certain embodiments, the retaining layers 17 and 18 are membranes and made from electrically insulating, ion-conducting polymers, such as polyethylene, poly vinyl chloride, polypropylene, Teflon, nylon, or any combinations thereof. Additionally, the retaining layers 17 and 18 may be in the form of a mesh, or a sheet.

Additionally, the current collectors 11 and 12 may be configured as a plate, a mesh, a foil, or a sheet and formed from a metal or metal alloy. The metal may include titanium, platinum, iridium, or rhodium. The metal alloys may include stainless steel. In one embodiment, the current collectors 11 and 12 comprise graphite. Alternatively, the current collectors 11 and 12 comprise a plastic material, such as a polyolefin, which may include polyethylene. The plastic current collectors 11 and 12 may be mixed with conductive carbon black or metallic particles to achieve the necessary level of conductivity required.

As in the illustrated embodiment, the electrodes 13 and 14 are in the form of plates that are disposed parallel to each other to form a stacked structure. In certain embodiments, the first and second electrodes 13 and 14 may have varied shapes, such as a sheet, a block, or a cylinder. Further, these electrodes may be arranged in varying configurations. For example, the first and second electrodes may be disposed concentrically with a spiral and continuous space therebetween.

The first and second electrodes 13 and 14 may include electrically conducting materials, which may or may not be thermally conducting. In one embodiment, the conducting material may include carbon, or carbon based materials. Further, the carbon-based materials may include activated carbon particles, porous carbon particles, carbon fibers, or combinations thereof. Additionally, the conducting materials may include a conducting composite, such as oxides of manganese, or iron, or both, or carbides of titanium, zirconium, vanadium, tungsten, or combinations thereof.

The conducting materials may have particles with smaller sizes and large surface areas. As will be appreciated, due to large surface areas such conducting materials may result in high adsorption capacity, high energy density and high capacitance of the supercapacitor 10. In embodiments of the invention, the conducting materials of the electrodes 13 and 14 may be deposited on the current collectors 11 and 12 by employing one or more deposition techniques, such as sputtering, spraying, spin-coating, calendering or printing.

Figure 2:
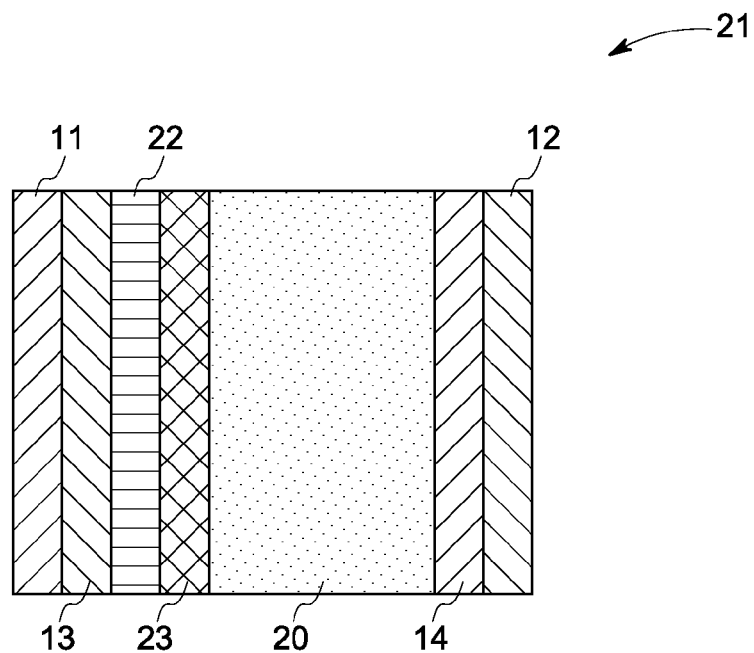
FIG. 2 is a schematic cross-section diagram of the supercapacitor in accordance with another embodiment of the invention.

As illustrated in FIG. 2, a supercapacitor 21 in accordance with another embodiment of the invention is provided. The same reference numbers in the embodiments shown in FIGS. 1-2 may indicate the same elements. In this embodiment, the supercapacitor 21 comprises the first current collector 11, the second current collector 12, the first electrode 13 coupled to the first current collector 11, the second electrode 14 coupled to the second current collector 12, an ionic carrier 22 positioned between the first electrode 13 and the second electrode 14, and an retaining layer 23 coupled to the ionic carrier 22 to hold the ionic carrier 22 between the first electrode 13 and the retaining layer 23. The current collectors 11 and 12 may be connected to positive and negative terminals of the power source 19 (shown in FIG. 1), respectively. The electrolyte 20 (shown in FIG. 1) may be dispersed in the supercapacitor 21.

In one embodiment, the ionic carrier 22 may also be an ionic polymer, such as the macromolecular ampholyte including polyphosphate or polysilicate, for facilitating transmission of both the anions and cations of the electrolyte 20. Alternatively, the ionic carrier 22 may be only for anion or cation exchange in certain situations, for example to accelerate the adsorption of a specific ion species, such as an ionic impurity in a liquid. In the illustrated embodiment of FIG. 2, the ionic carrier 22 may be in a gel or a solution form. In particular, the spacer 100 (shown in FIG. 1) may be employed to separate the retaining layer 23 and the electrode 14.

In embodiments of the invention, the supercapacitors may be used as an energy storage device. Alternatively, the supercapacitors may also be used as a supercapacitor desalination (SCD) device. The SCD device refers to a supercapacitor that is employed for desalination of seawater or de-ionization of other brackish waters to reduce the amount of salt to a permissible level for domestic and industrial use. Additionally, the SCD device may remove or reduce other charged or ionic impurities from a liquid, such as wastewater or effluents from agricultural, industrial or municipal processes.

Figure 3:
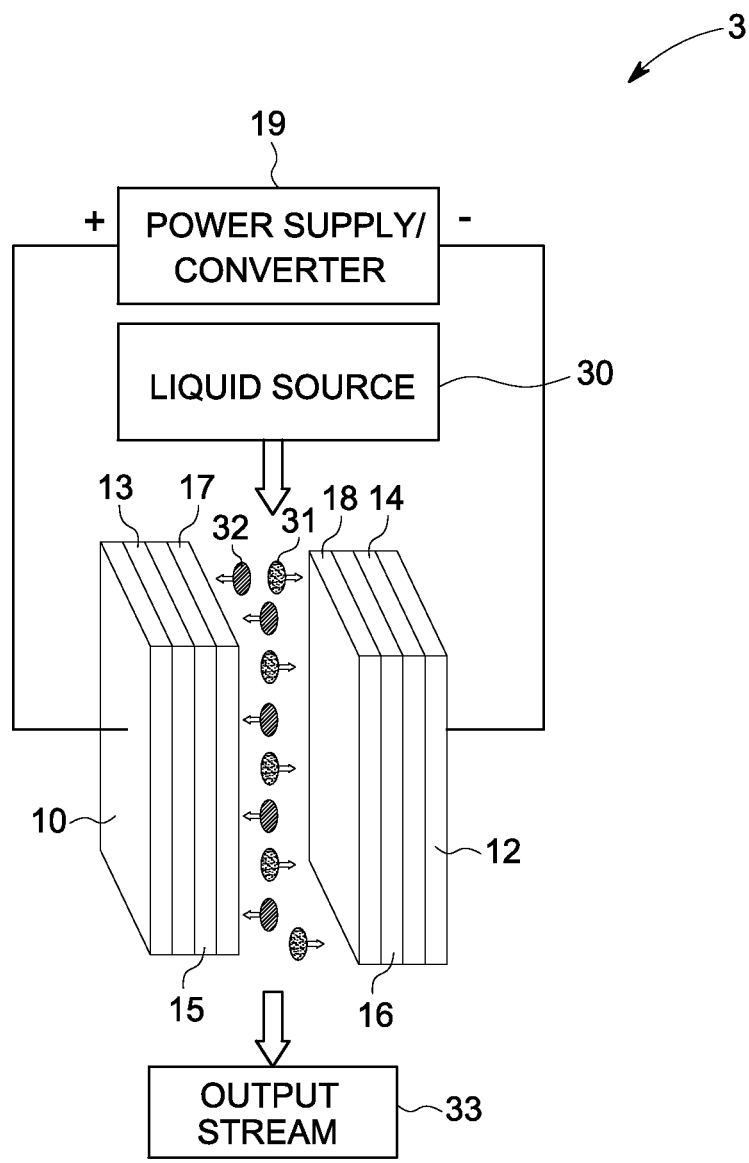
FIG. 3 is a perspective view of a supercapacitor desalination cell in accordance with one embodiment of the invention.

FIG. 3 illustrates a perspective diagram of a supercapacitor desalination (SCD) device. Taking the supercapacitor 10 as an example, the SCD device 3 comprises the SCD cell 10. The power source 19 is provided to energize the first and the second electrodes 13 and 14 to opposite electrical polarities. During the charging state, when an input liquid from a liquid source 30, such as sodium chloride, having charged species passes through between the electrodes 13 and 14, cations 31 move towards the cathode 14, and anions 32 move towards the anode 13. As a result of this charge accumulation inside the SCD cell 10, an output stream 33, which is a dilute liquid coming out of the SCD cell 10, has a lower concentration of charged species as compared to the input liquid. In certain embodiments, the dilute liquid 33 may be again subjected to de-ionization by being fed through another SCD cell. In one embodiment, the spacer 100 is employed to define a flow channel (not shown) thereon so that the input liquid can pass through when the distance between the first and second retaining layers 17 and 18 is small.

During the discharging state, the adsorbed ions dissociate from the surfaces of the first and second electrodes 13 and 14. In one embodiment, during the discharging state of the SCD cell 10, the polarities of the first and second electrodes 13 and 14 may be maintained the same, a short circuit can be applied between the two electrodes so that the anions and cations 32 and 31 desorb from the first and second electrodes 13 and 14. In another embodiment, the polarities of the first and second electrodes 13 and 14 can be reversed. Thus, the cations 31 accumulated on the second electrode 14 move towards the first electrode 14, and the anions 32 accumulated on the first electrode 13 move towards the second electrode 14. As a result, the output stream 33 may have a higher concentration of charged species compared to the input liquid.

Figure 4:
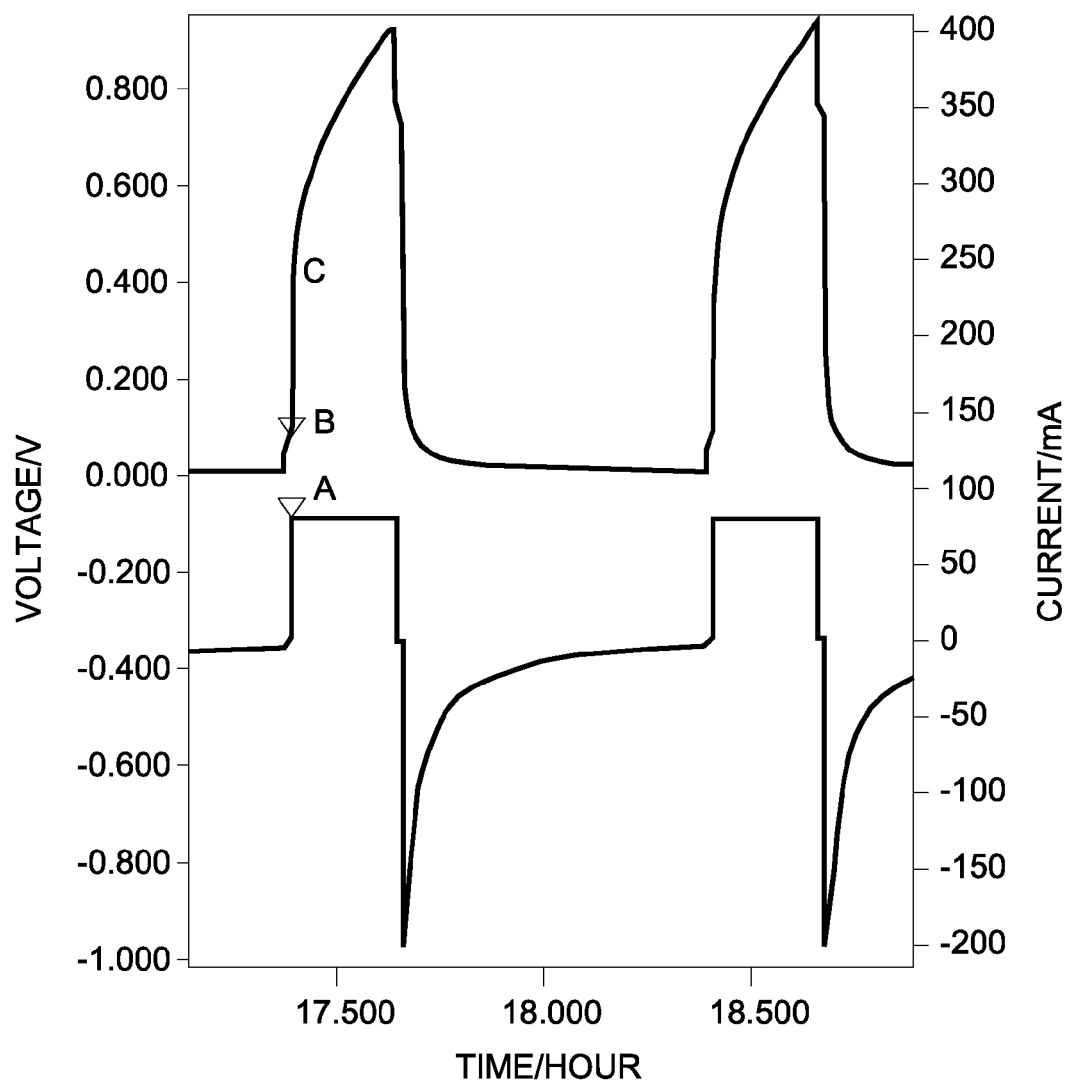
FIG. 4 is an experimental curve of a supercapacitor desalination cell without ionic carrier.
Figure 5:
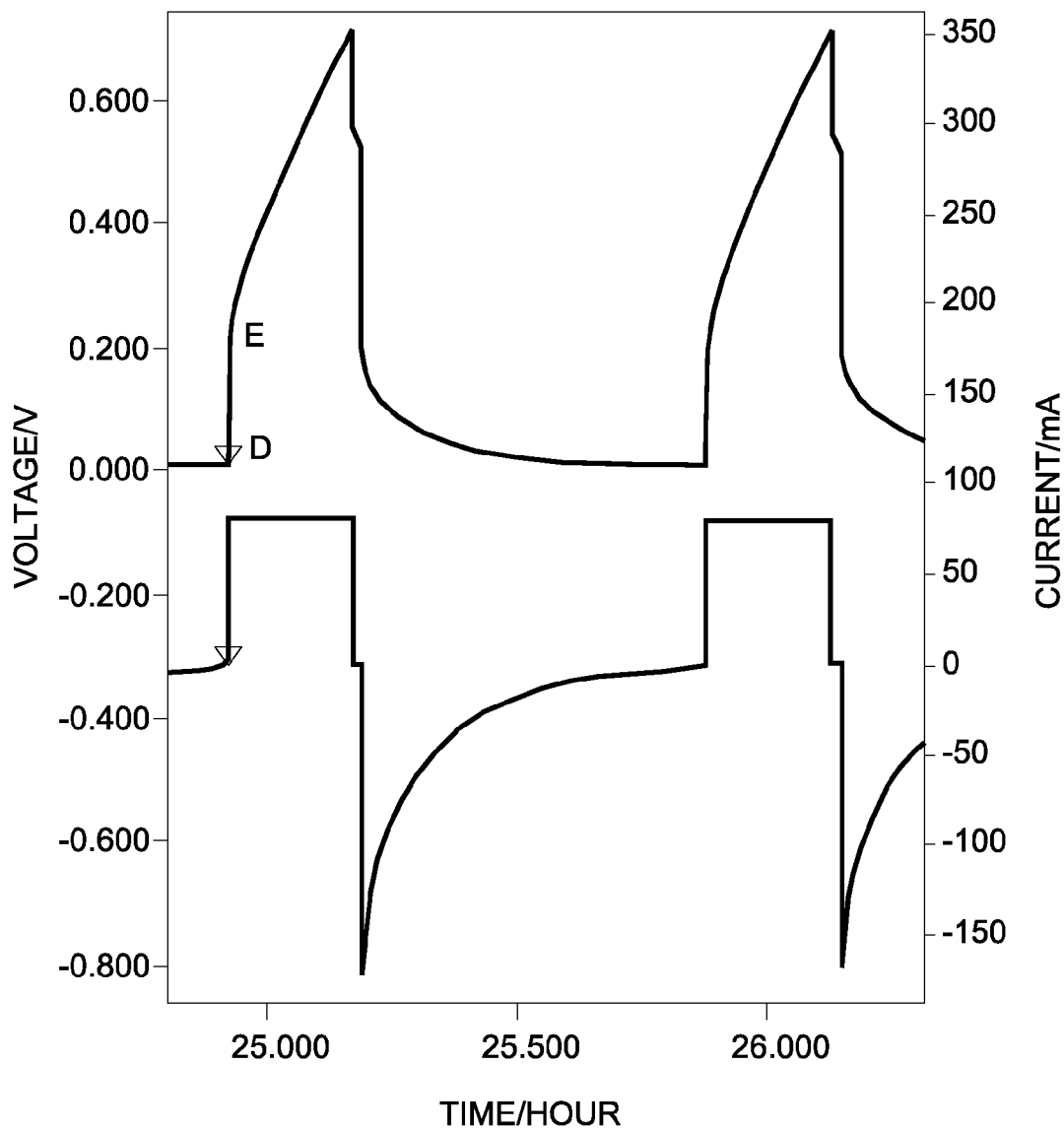
FIG. 5 is an experimental curve of a supercapacitor desalination cell with PSS and PDDA.

FIG. 4 shows an experimental curve of a supercapacitor desalination cell without ionic carrier. FIG. 5 shows an experimental curve of a supercapacitor desalination cell with PSS and PDDA. In FIG. 4, when an electrical current of 80 mA is applied to the supercapacitor desalination cell without the ionic carrier under a fluid passing through, its voltage jump $V_{AC}$ is about 0.4V, and its open circuit voltage (OCV) $V_{AB}$ is about 0.1V, thus, its cell resistance can be expressed as (0.4V-0.1V)/0.08 A=3.75 Ohm. In FIG. 5, when the same 80 mA electrical current is applied to the supercapacitor desalination cell with PSS and PDDA under the same fluid passing through, its voltage jump $V_{DE}$ is about 0.2V, and its OCV is very small and may not be calculated, thus, its cell resistance can be expressed as 0.2V/0.08 A=2.5 Ohm. Evidently, the internal resistance the supercapacitor desalination cell with PSS and PDDA has 30% reduction comparing with that of the supercapacitor desalination cell without the ionic carrier. Thus, the ionic carriers 15 and 16 can reduce the internal resistance of the SCD cell 10. Accordingly, a significant amount of energy may be saved, especially when treating a large amount of the input liquid.

Figure 6:
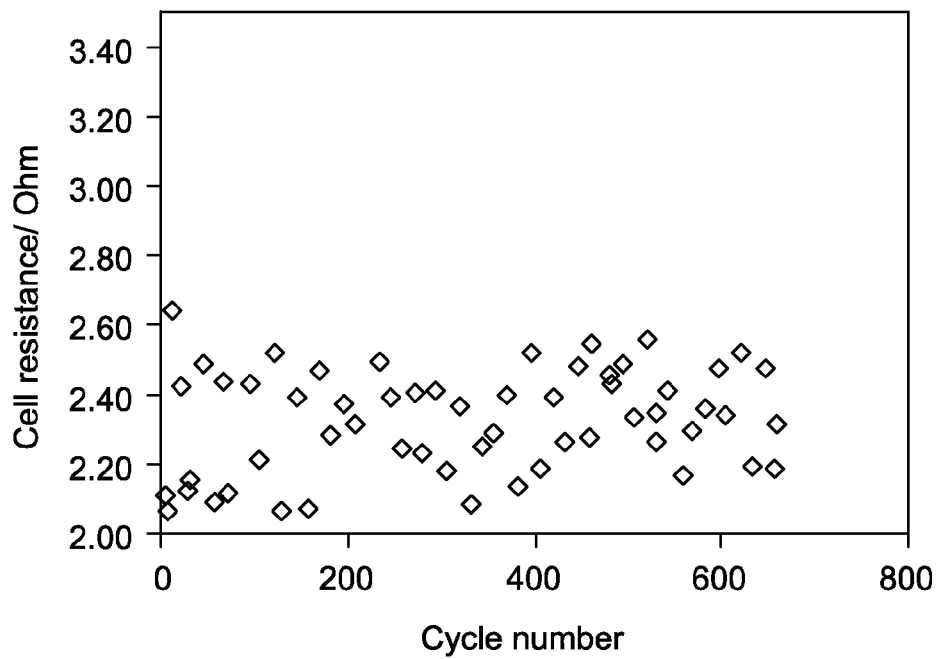
FIG. 6 is an experimental diagram showing stability of the supercapacitor desalination cell with PSS and PDDA.

As illustrated in FIG. 6, when the supercapacitor desalination cell provided by the invention comprising PSS and PDDA is shown to be operationally robust over more than 600 cycles, its cell resistance remains in the range of 2.0-2.6 Ohm. The data given in FIG. 6 demonstrate that efficiency of the supercapacitor desalination cell 10 with PSS and PDDA may be rather stable.

Figure 7:
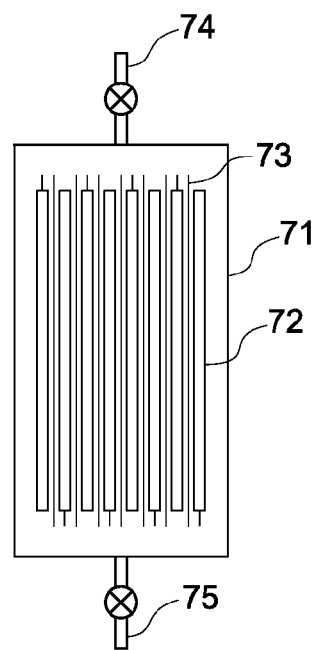
FIG. 7 is an assembled schematic planar view of a plurality of supercapacitor desalination cells.

FIG. 7 shows an assembled schematic planar view of a plurality of supercapacitor desalination cell. The supercapacitor desalination assembly employs a vessel 71. The supercapacitor desalination cells 72 are arranged side by side in the vessel 71, and each cell 72 may be connected to a respective power source (not shown) similar to the power source 19. Further, the assembly 70 has insulating separators 73 disposed between every two adjacent cells 72 to electrically insulate the two adjacent cells 72. Alternatively, the supercapacitor desalination cells 72 may be connected to one power source, and all the cells 72 may be connected in series. The vessel 71 defines an inlet 74 and an outlet 75 for the input liquid and the output stream 33 (shown in FIG. 3) passing in and out respectively. In the illustrated example, the supercapacitor desalination cell 72 may be the same as the cell 10 or 21, or other embodiments described above. As will be appreciated, the input liquid may be guided inside the vessel 71 by using external forces, such as pumping. Additionally, the cells 72 may also be arranged in such a configuration that an output stream from one cell can be used as an input liquid for the other cell.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A supercapacitor, comprising:
   a first electrode;
   a second electrode;
   a first ionic carrier comprising a first polyelectrolyte and configured to contact the first electrode to provide a first ion-conductive pathway for transportation of ions to and from the first electrode;
   an electrolyte dispersed between the first and the second electrodes to provide the ions;
   a first retaining layer passable for ions traveling towards the first electrode from the electrolyte contacting the first retaining layer but not passable to the first polyelectrolyte, the first retaining layer configured to retain the first ionic carrier between the first electrode and the first retaining layer;
   a first current collector configured to contact the first electrode; and
   a second current collector configured to contact the second electrode.

2. The supercapacitor of claim 1, comprising a second ionic carrier comprising a second polyelectrolyte and a second retaining layer passable for ions traveling to the second electrode from the electrolyte contacting the second retaining layer but not passable to the second polyelectrolyte, the second ionic carrier is configured to contact the second electrode to provide a second ion-conductive pathway for transportation of the ions to and from the second electrode, and the second retaining layer is configured to retain the second ionic carrier between the second electrode and the second retaining layer.

3. The supercapacitor of claim 2, wherein the first polyelectrolyte comprises poly(diallyldimethyl ammonium chloride) and the second polyelectrolyte comprises polystyrene sulfate sodium.

4. The supercapacitor of claim 2, wherein the first and second retaining layers comprise ion exchange membranes and are configured to protect the respective first and second ionic carrier from losing effectiveness.

5. The supercapacitor of claim 4, wherein the first and second pathways are configured to reduce resistance between the respective electrodes and the retaining layers.

6. The supercapacitor of claim 4, wherein the first retaining layer is only passable for anions and the second retaining layer is only passable for cations.

7. The supercapacitor of claim 2, further comprising a spacer disposed between the first and second retaining layers.

8. The supercapacitor of claim 1 wherein the first ionic carrier is in a gel form or a solution form.

9. A supercapacitor desalination cell, comprising:
   a first electrode configured to adsorb ions in a charging state of the cell and desorb ions in a discharging state of the cell;
   a second electrode configured to adsorb the ions in a charging state of the cell and desorb ions in a discharging state of the cell;
   a first ionic carrier comprising a first polyelectrolyte and configured to contact the first electrode to provide a first ion-conductive pathway for transportation of the ions to and from the first electrode;
   a first retaining layer passable for ions traveling towards the first electrode from an electrolyte contacting the first retaining layer but not passable to the first polyelectrolyte, the first retaining layer configured to retain the first ionic carrier between the first electrode and the first retaining layer;
   a first current collector configured to contact the first electrode; and
   a second current collector configured to contact the second electrode.

10. The supercapacitor desalination cell of claim 9, wherein the first polyelectrolyte comprises a macromolecular ampholyte.

11. The supercapacitor desalination cell of claim 9, comprising a second ionic carrier comprising a second polyelectrolyte and a second retaining layer passable for ions traveling to the second electrode from an electrolyte contacting the second retaining layer but not passable to the second polyelectrolyte, the second ionic carrier is configured to contact the second electrode to provide a second ion-conductive pathway for transportation of the ions to and from the second electrode, the second retaining layer is configured to retain the second ionic carrier between the second electrode and the second retaining layer.

12. The supercapacitor desalination cell of claim 11, wherein the first and second pathways are to reduce resistance between the respective electrodes and the retaining layers.

13. The supercapacitor desalination cell of claim 11, further comprising a spacer disposed between the first and second retaining layers.

14. The supercapacitor desalination cell of claim 11, wherein the first polyelectrolyte comprises cation groups and the second polyelectrolyte comprises anion groups.

15. The supercapacitor desalination cell of claim 14, wherein the first polyelectrolyte comprises poly(diallyldimethyl ammonium chloride) and the second polyelectrolyte comprises polystyrene sulfate sodium.

16. The supercapacitor desalination cell of claim 11, wherein the first and second retaining layers comprise ion exchange membranes and are configure to protect the respective first and second ionic carrier from losing effectiveness.

17. The supercapacitor desalination cell of claim 16, wherein the first retaining layer is only passable for anions and the second retaining layer is only passable for cations.

18. The supercapacitor desalination cell of claim 11, wherein the first and the second ionic carriers are in a solution form.

19. The supercapacitor desalination cell of claim 11, wherein the first and second ionic carrier are in a gel form.

20. The supercapacitor of claim 9 wherein the first ionic carrier is in a gel form or a solution form.

21. A supercapacitor desalination device, comprising:
a supercapacitor desalination cell comprising a first electrode and a second electrode both configured to adsorb ions in a charging state of the cell and desorb ions in a discharging state of the cell, a first ionic carrier comprising a first polyelectrolyte and configured to contact the first electrode to provide a first ion-conductive pathway for transportation of the ions to and from the first electrode, a first retaining layer passable for ions traveling towards the first electrode from an electrolyte contacting the first retaining layer but not passable to the first polyelectrolyte, the first retaining layer configured to retain the second ionic carrier between the second electrode and the second retaining layer, a first and a second current collectors configured to contact the first electrode and the second electrode, respectively;
a power source configured to energize the first and the second electrodes to opposite electrical polarities; and
a liquid source configured to pass a liquid through the cell for desalination.

22. The supercapacitor desalination device of claim 21, wherein the supercapacitor desalination cell further comprises a second ionic carrier comprising a second polyelectrolyte and a second retaining layer passable for ions traveling to the second electrode from an electrolyte contacting the second retaining layer but not passable to the second polyelectrolyte, the second ionic carrier is configured to contact the second electrode to provide a second ion-conductive pathway for transportation of the ions to and from the second electrode, the second retaining layer is configured to retain the second ionic carrier between the second electrode and the second retaining layer.

23. The supercapacitor desalination device of claim 22, wherein the supercapacitor desalination cell further comprises a spacer disposed between the first and second retaining layers.

24. The supercapacitor desalination device of claim 22, wherein the first polyelectrolyte comprises poly(diallyldimethyl ammonium chloride) and the second polyelectrolyte comprises polystyrene sulfate sodium.

25. The supercapacitor of claim 21 wherein the first ionic carrier is in a gel form or a solution form.

26. A method, comprising:
providing a first electrode and a second electrode;
providing a first ionic carrier comprising a first polyelectrolyte and configured to contact the first electrode to provide a first ion-conductive pathway for transportation of ions to and from the first electrode;
providing a first retaining layer passable for ions traveling towards the first electrode from an electrolyte contacting the first retaining layer but not passable to the first polyelectrolyte, the first retaining layer configured to retain the first ionic carrier between the first electrode and the first retaining layer;
providing a first current collector configured to contact the first electrode; and
providing a second current collector configured to contact the second electrode.

27. The method of claim 26, comprising providing a second ionic carrier comprising a second polyelectrolyte and configured to contact the second electrode to provide a second ion-conductive pathway for transportation of the ions to and from the first electrode, and a second retaining layer passable for ions traveling towards the second electrode from an electrolyte contacting the second retaining layer but not passable to the second polyelectrolyte, the second retaining layer configured to retain the second ionic carrier between the second electrode and the second retaining layer.

28. The method of claim 27, further comprising providing a spacer disposed between the first and second retaining layers.

29. The method of claim 28, wherein the first polyelectrolyte comprises poly(diallyldimethyl ammonium chloride) solution and the second polyelectrolyte comprises polystyrene sulfate sodium solution.

30. The method of claim 26 wherein the step of providing the first ionic carrier comprises contacting the first electrode with the ionic carrier in a solution form or by polymerizing or cross-linking the ionic carrier in contact with the first electrode.

31. A supercapacitor, comprising:
a first electrode;
a second electrode;
a first ionic carrier, in a gel form or a solution form, configured to contact the first electrode to provide a first ion-conductive pathway for transportation of ions to and from the first electrode;
a first retaining layer configured to retain the first ionic carrier between the first electrode and the first retaining layer;
an electrolyte dispersed between the first and the second electrodes to provide the ions;
a first current collector configured to contact the first electrode; and
a second current collector configured to contact the second electrode.

32. A supercapacitor desalination cell, comprising:
a first electrode configured to adsorb ions in a charging state of the cell and desorb ions in a discharging state of the cell;
a second electrode configured to adsorb the ions in a charging state of the cell and desorb ions in a discharging state of the cell;
a first ionic carrier, in a gel form or a solution form, configured to contact the first electrode to provide a first ion-conductive pathway for transportation of the ions to and from the first electrode;
a first retaining layer configured to retain the first ionic carrier between the first electrode and the first retaining layer;
a first current collector configured to contact the first electrode; and
a second current collector configured to contact the second electrode.

33. A supercapacitor desalination device, comprising:
a supercapacitor desalination cell comprising a first electrode and a second electrode both configured to adsorb ions in a charging state of the cell and desorb ions in a discharging state of the cell, a first ionic carrier, in a gel form or a solution form, configured to contact the first electrode to provide a first ion-conductive pathway for transportation of the ions to and from the first electrode, a first retaining layer configured to retain the second ionic carrier between the second electrode and the second retaining layer, a first and a second current collectors configured to contact the first electrode and the second electrode, respectively;
a power source configured to energize the first and the second electrodes to opposite electrical polarities; and a liquid source configured to pass a liquid through the cell for desalination.

* * * * *